United States Patent

[11] 3,582,877

[72] Inventor Luc P. Benoit
Los Angeles, Calif.
[21] Appl. No. 821,432
[22] Filed May 2, 1969
[45] Patented June 1, 1971
[73] Assignee Bell L Howell Company
Chicago, Ill.

[54] THERMAL MAGNETIC INFORMATION RECORDING
7 Claims, 4 Drawing Figs.

[52] U.S. Cl. .......... 346/74, 179/100.2, 250/65, 340/174
[51] Int. Cl. .......... G01d 15/12
[50] Field of Search .......... 346/74 (MT); 179/100.2 (CRT), 8 (CF); 250/65(.1); 340/174; 161/410—412; 117/37.5, 235

[56] References Cited
UNITED STATES PATENTS
2,793,135 5/1957 Sims et al. .......... 346/74X
3,176,278 3/1965 Mayer .......... 346/74X
3,512,170 5/1970 Nelson .......... 346/74

*Primary Examiner*—Bernard Konick
*Assistant Examiner*—Gary M. Hoffman
*Attorney*—Raymond A. Andrew

ABSTRACT: In information recording methods in which a magnetic recording medium is magnetized by subjection to heating above a transition temperature and subsequent subjection to a cooling cycle in the presence of a magnetic field, the improvement of selecting a pattern of first regions of the recording medium representative of the information, heating the information-representative pattern of first regions to a first temperature above the transition temperature, heating second regions of the recording medium to a second temperature above the first temperature, applying the magnetic field to the recording medium, subjecting the recording medium to the cooling cycle whereby the first regions are magnetized when such first regions cool through and below the transition temperature, and permitting the second regions to cool through and below the transition temperature.

INVENTOR.

[signature]

INVENTOR.
Luc P. Benoit

THERMAL MAGNETIC INFORMATION RECORDING

RELATED APPLICATIONS

Subject matter of the present disclosure is related to subject matter disclosed in the following patent applications, the contents of which are herewith incorporated herein by references:

Ser. No. 821,232, "Magnetic Information Recording," filed of even date herewith, by the present inventor, and assigned to the present assignee;

Ser. No. 821,394, "Magnetic Information Recording," filed of even date herewith, by the present inventor, and assigned to the present assignee.

BACKGROUND OF THE INVENTION

1. Field of the Invention

The subject invention relates to magnetic information recording and, more specifically, to thermomagnetic information recording methods and apparatus.

2. Prior Art

Thermomagnetic recording methods have received intensified interest in recent years since they point to information recording techniques that are superior to those attainable with magnetic recording head structures and that permit advanced processes such as imaging and document copying.

A class of thermomagnetic recording methods known under the designation "thermoremanent magnetization" points to techniques which are potentially capable of providing magnetic records that are superior in intensity and resolution to records produced by an information-controlled selective demagnetization of a premagnetized medium.

Briefly, if a magnetic recording medium is heated to temperatures above its Curie point, the ferromagnetic property of the recording medium gives way to paramagnetism. If the medium is cooled in the absence of a magnetic field, it acquires a highly random magnetization state. By contrast, if the medium is cooled in the presence of a magnetic field, it acquires a strong remanent magnetization the slope of which is superior to that obtained by isothermal remanent magnetization or even by anhysteretic remanent magnetization (see C. D. Mee, "The Physics of Magnetic Recording," (North-Holland Publishing Co., 1964), pp. 80 to 84 and particularly FIG. 3.19).

While the exploitation of thermoremanent magnetization techniques has been proposed for information recording and particularly for imaging purposes, it has so far been difficult to provide a positive copy from an original image or document by thermoremanent magnetization techniques.

SUMMARY OF THE INVENTION

The subject invention provides a solution of the latter problem.

From one aspect thereof the invention resides in a method of recording information, comprising the steps of providing a magnetic recording medium which is susceptible to magnetization upon subjection to heating above a transition temperature and subsequent subjection to a cooling cycle in the presence of a magnetic field, selecting a pattern of first regions of the recording medium representative of the information, heating this information-representative pattern of first regions to a first temperature above the transition temperature, heating second regions of the recording medium to a second temperature above the first temperature, applying a magnetic field to the recording medium, subjecting the recording medium to a cooling cycle whereby the first regions are magnetized when such first regions cool through and below the transition temperature, removing the magnetic field from the recording medium before the second regions cool through the transition temperature, and permitting the second regions to cool through and below the transition temperature.

As the description proceeds it will be recognized that this embodiment provides the production of positive copies of original documents or images.

BRIEF DESCRIPTION OF THE DRAWINGS

The invention will be more readily apparent from the following detailed description of preferred embodiments thereof, illustrated by way of example in the accompanying drawings in which.

DESCRIPTION OF PREFERRED EMBODIMENTS

Figure 1:
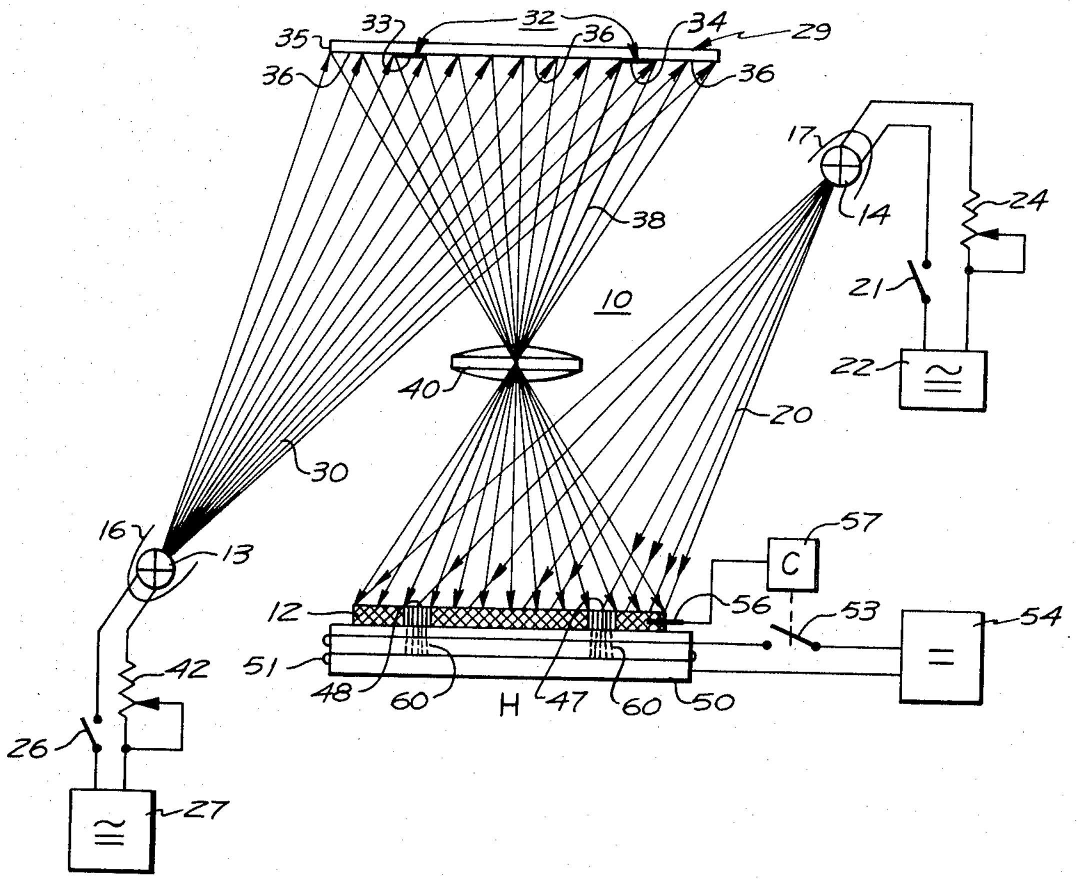
FIG. 1 is a side view of essential parts of a document copying apparatus in accordance with a first preferred embodiment of the invention.

The document copying apparatus 10 shown in FIG. 1 employs a thermomagnetic recording medium 12 which is susceptible to magnetization upon subjection to a cooling cycle in the presence of a magnetic field. Suitable recording media include the thermomagnetic recording media described, for instance, in British Pat. Specification No. 1,139,232, "Improvement Relating to Thermomagnetic Recording," filed by E. I. du Pont de Nemours and Company, and published on Jan. 8, 1969, and the thermomagnetic recording media described in the copending U.S. Pat. application Ser. No. 649,540, "Magnetic Information Recording," filed June 28, 1967, by James U. Lemke, and assigned to the assignee of the subject application. Typically, these media include a supporting base which is preferably made of a high-temperature plastic material, and a coating which contains particles of a low Curie point medium, such as chromium dioxide, and which is deposited on the supporting base.

As has been disclosed in the latter Lemke application, the magnetic particles in the coating preferably have a quality of anisotropy, such as shape anisotropy, which dominates crystal anisotropy so as to impart on the recording medium an acute coercivity and remanence curve in the vicinity of the Curie point.

If desired, the light sensitivity of the thermomagnetic medium may be considerably increased by a combination of the thermomagnetic medium with a photoconductor which converts an incoming luminous image into a thermal image that will bring about the desired thermomagnetic effect. Photosensitive thermomagnetic recording media of this type are disclosed in the copending patent application Ser. No. 756,942, "Magnetic Imaging," filed Sept. 3, 1968, by Joseph Gaynor and James U. Lemke, and assigned to the assignee of the subject application.

For the purpose of simplicity, the subject application merely shows a one-stratum thermomagnetic recording medium 12, with the understanding, however, that this one-stratum representation is intended to cover thermomagnetic recording media in general, and thermomagnetic recording media of the type disclosed in the aforesaid British Pat. and copending U.S. applications in particular.

The document copying apparatus includes two lamps 13 and 14 with accompanying reflectors 16 and 17. If the medium 12 is a photosensitive thermomagnetic medium, the lamps 13 and 14 are designed to emit actinic light to which the medium 12 is sensitive. If the medium 12 does not include photoconductive material, then the lamps 13 and 14 are designed to emit radiations which are capable of heating the magnetic particles in the medium 12 upon impingement thereof. This may be accomplished by designing the lamps 13 and 14 so that they emit a strong component in the infrared range.

A short restatement of thermoremanent magnetization techniques may be helpful at this juncture. Briefly, particles in the recording medium 12 are thermoremanently magnetized if they are first heated to a temperature above their Curie point, and are thereupon cooled to a temperature below their Curie point in the presence of a magnetic field. By contrast, particles in the recording medium 12 acquire and retain a random magnetization (no net magnetization) if they are first heated to a temperature above their Curie point, and are thereupon cooled to a temperature below their Curie point without being exposed to a magnetic field during such cooling cycle.

The apparatus of FIG. 1 exploits both of these principles.

More specifically, the lamp 14 exposes the recording medium 12 to radiations 20 upon closure of a normally open switch 21 which connects the lamp to a source 22 of electric energy. A variable resistor 24 in the energizing circuit of the lamp 14 permits an adjustment of the intensity of the radiations 20. The resistor 24 is adjusted so that the recording medium 12 is heated to the temperature $T_2$ indicated in FIG. 2. As apparent from that figure which illustrates the coercivity $H_c$ of the medium 12 as a function of its temperature, the temperature $T_2$ is somewhat above the Curie point $T_c$ of the recording medium 12.

Upon closure of a normally open switch 26, the lamp 13 is connected to a source of electrical energy 27 so that it irradiates a master document 29 with radiations 30. The information content 32 of the master 29 consists of radiation-absorbing or dark characters 33 and 34 which are printed on a sheet 35 and stand in contrast to the light portions or background 36 thereof.

The reference numeral 38 designates radiations which are reflected from the light portions 36 of the document 29, and which are projected onto the recording medium 12 by a lens 40.

Figure 2:
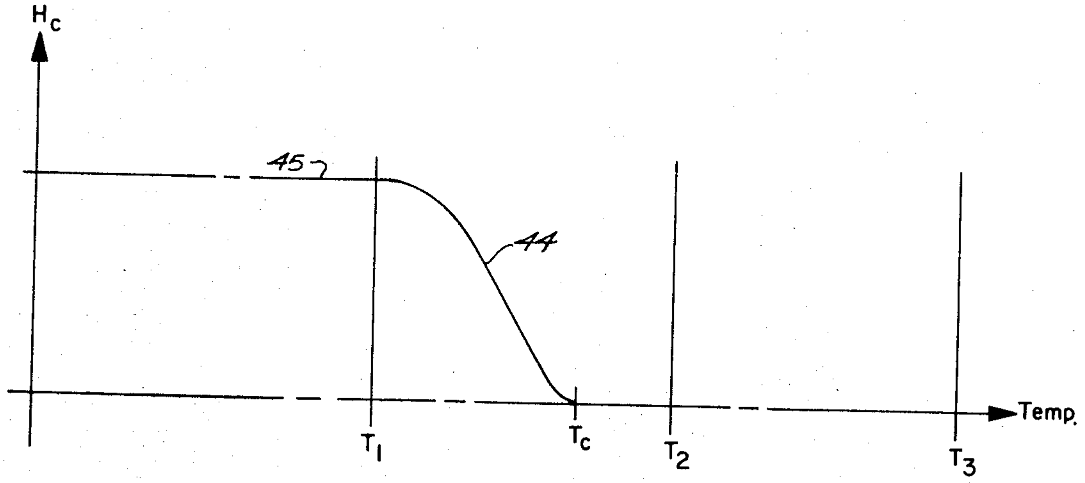
FIG. 2 is a graph plotting coercivity of a thermoremanent magnetization recording medium against its temperature.

A variable resistor 42 in the energizing circuit of the lamp 13 is adjusted so that the radiations 38 reflected by the document 29 and projected onto the recording medium 12 heat those portions of this medium on which they impinge to the temperature $T_3$ indicated in FIG. 2. As apparent from FIG. 2, the temperature $T_3$ is higher than the temperature $T_2$. By way of example, it is preferred that the difference between the temperature $T_2$ and $T_3$ corresponds at least to the difference between the temperature $T_2$ and a lower temperature $T_1$ which, as indicated in FIG. 2, is below the acute region 44 of the coercivity curve 45 of the recording medium 12.

In viewing FIG. 1 it will be recognized that practically no reflected radiation 38 impinge upon the regions 47 and 48 of the medium 12 which correspond to the radiation-absorbing characters 33 and 34 on the document 29. Accordingly, these regions 47 and 48 are not heated to the temperature $T_3$ but remain at the temperature $T_2$ or at a temperature in the close vicinity of $T_2$.

In other words, the reflected radiations 38 provide a thermal image which corresponds to a negative representation of the image or record contained on the document 29, and this negative thermal image heats the medium 12 to the temperature $T_3$ above the temperature $T_2$ where it impinges on the recording medium 12.

Preparatory to the thermoremanent magnetization presently to be described, a magnetic field H is applied to the recording medium 12. To this end, a ferromagnetic plate 50 adjacent the recording medium 12 has a winding 51 that, upon closure of a normally open switch 53, is energized with electric current, preferably direct current, from an electric current source 54.

After the magnetic field H has been established by closure of the switch 53, the switches 21 and 26 are opened so that the lamps 13 and 14 are switched off. Since this results in a cessation of the radiations 20 and 38, the recording medium 12 commences to cool by giving off heat energy to its environment. Since the information-containing regions 47 and 48 are only heated to the temperature $T_2$, they will cool through the Curie point $T_c$ before the remainder of the medium, which is at temperature $T_3$ will cool through such Curie point.

As the regions 47 and 48 cool through the Curie point $T_c$ in the presence of the magnetic field H, they are strongly magnetized by thermoremanent magnetization. Preferably, the regions 47 and 48 are cooled to the temperature $T_1$ below the acute portion 44 of the coercivity curve 45 of the medium 12 before the magnetic field H is removed by opening of the switch 53 or, if necessary, by a removal of the magnet structure 50.

At any rate, the magnetic field H is removed or neutralized before the remainder of the medium 12, other than the regions 47 and 48, cool through the Curie point $T_c$. In other words, the portions of the magnetic recording medium 12 other than the regions 47 and 48 are caused to cool through the Curie point $T_c$ without the application of the magnetic field H thereto. This means that these background portions remain randomly magnetized and display thus no net magnetization. Accordingly, a strong magnetic record 60 of the information content 32 of the original document is produced.

In the illustrated preferred embodiment, a temperature sensor 56 senses the temperature of the medium 12. A conventional control 57 responds to the sensor 56 and opens the switch 53 when the temperature of the medium 12 (other than the portions 47 and 48) has decreased to the temperature $T_2$ above but in the vicinity of the Curie point $T_c$.

A further beneficial effect of the invention may be noted at this juncture. Briefly, fringes of the regions 47 and 48 tend to be heated above the temperature $T_2$ by heat energy which flows from surrounding regions that are at the temperature $T_3$. Upon cooling, these higher temperature fringe areas of the portions 47 and 48 tend to cool through the Curie point $T_c$ only after the magnetic field H has been switched off or removed. Accordingly, these fringes experience no magnetization at that time.

However, as these fringes cool through the Curie point together with the remainder of the magnetic medium other than the magnetized portions 47 and 48, they will be strongly magnetized by a thermoremanent magnetization effect induced by the magnetization of the portions 47 and 48. In this manner, the diminution in size of the information-representing portions 47 and 48 through unavoidable transverse heat flow will be automatically restored under the principles of the subject invention. Moreover, the resulting magnetization of the fringe areas under discussion will generally be opposite to the magnetization of the remainder of the regions 47 and 48, so that every portion of the magnetic information record will be outlined by strong magnetic gradients. This imparts a high contrast and resolution to the magnetic record 60 which is particularly apparent when such record is printed out by means of magnetic toner.

For an illustration of the effects described in the preceding paragraph, reference may be had to my above-mentioned copending patent application Ser. No. 821,232, and particularly to FIGS. 3 and 4 thereof and accompanying text.

The magnetic record established in the medium 12 may be read or printed out in a conventional manner.

Figure 3:
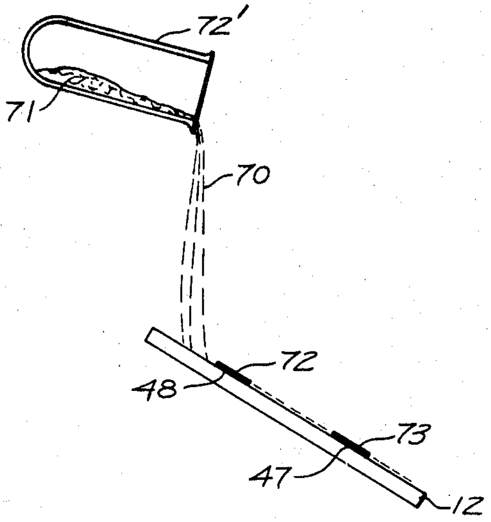
FIGS. 3 and 4 illustrate the printing out of the magnetic image recorded by the apparatus of FIG. 1.

A first step of a suitable magnetic printout procedure is illustrated in FIG. 3 in which a magnetic printout toner 70 is sprinkled from a supply 71 in a vessel 72 over the surface of the medium 12. The printout toner may be of a conventional type in which magnetic particles are encapsulated in fusible shells which may be of a thermoplastic material. As the surface of the medium 12 is exposed to the toner 70, toner particles will be attracted by and adhere to the magnetized medium regions 47 and 48 and will form dark characters 72 and 73 thereon which correspond to the characters 33 and 34 of the original document 29.

Figure 4:
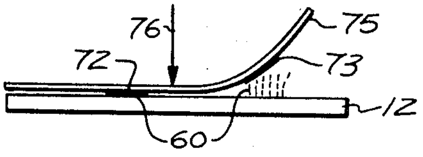

After excessive toner particles have been shaken off the medium 12 the characters 72 and 73 are printed out as schematically indicated in FIG. 4. According to this figure a sheet 75 of paper is forcefully brought into contact with the medium 12 as indicated by the arrow 76. Heat may be employed if desired to cause a fusing of the characters 72 and 73 to the sheet 75 so that the characters stick to the sheet as indicated at 73 when the same is removed from the medium 12.

Despite such printout, the magnetic record 60 will of course remain on the medium 12 until an intended erasure thereof by an alternating magnetic field or by a uniform above-Curie point heating. Accordingly, a practically unlimited number of copies can be printed out upon the provision of a magnetic master record.

I claim:

1. In a method of recording information, the improvement comprising:

providing a magnetic recording medium which is susceptible to magnetization upon subjection to heating above a transition temperature and subsequent subjection to a cooling cycle in the presence of a magnetic field;

selecting a pattern of first regions of said recording medium representative of said information;

heating said information-representative pattern of first regions to a first temperature above said transition temperature;

heating second regions of said recording medium to a second temperature above said first temperature;

applying said magnetic field to said recording medium;

subjecting said recording medium to said cooling cycle whereby said first regions are magnetized when said first regions cool through and below said transition temperature;

removing said magnetic field from said recording medium before said second regions cool through said transition temperature; and permitting said second regions to cool through and below said transition temperature.

2. A method as claimed in claim 1, wherein said second regions include substantially all regions of said recording medium other than said first regions.

3. A method as claimed in claim 1, wherein said transition temperature is the Curie temperature of said magnetic recording medium.

4. In a method of recording an image, the improvement comprising:

providing a magnetic recording medium which is susceptible to magnetization upon subjection to heating above a transition temperature and subsequent subjection to a cooling cycle in the presence of a magnetic field;

heating first regions of said recording medium corresponding to said image to a first temperature above said transition temperature;

heating second regions of said recording medium to a second temperature above said first temperature;

applying said magnetic field to said recording medium;

subjecting said recording medium to said cooling cycle whereby said first regions are magnetized when said first regions cool through and below said transition temperature;

removing said magnetic field from said magnetic recording medium before said second regions cool through said transition temperature; and permitting said second regions to cool through and below said transition temperature.

5. A method as claimed in claim 4, wherein said second regions correspond to a negative representation of said image.

6. A method as claimed in claim 4, wherein said first and second regions are heated by heating said first and second regions to said first temperature, by establishing a thermal image corresponding to a negative representation of said image, and by applying said thermal image to said recording medium to effect heating of said second regions to said second temperature.

7. A method as claimed in claim 4, wherein said thermal image is established by reflecting thermal radiations from a master record of said information.